United States Patent
Kargilis et al.

(10) Patent No.: US 6,431,141 B1
(45) Date of Patent: Aug. 13, 2002

(54) SECONDARY WIDE OPEN THROTTLE INDUCTION SYSTEM

(75) Inventors: John S. Kargilis, Northville; Martin Berger, Livonia, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/559,942

(22) Filed: Apr. 27, 2000

(51) Int. Cl.⁷ .............................. F02D 9/10; F02D 11/10
(52) U.S. Cl. ........................................ 123/336; 123/586
(58) Field of Search ................................ 123/336, 399, 123/585–588, 582, 59.5

(56) References Cited

U.S. PATENT DOCUMENTS

| | | | | |
|---|---|---|---|---|
| 2,153,350 A | * | 4/1939 | Stimac | 123/586 |
| 3,809,035 A | * | 5/1974 | Winton | 123/585 |
| 4,066,721 A | | 1/1978 | Graham | 261/62 |
| 4,114,572 A | * | 9/1978 | Matsuda et al. | 123/582 |
| 4,139,583 A | | 2/1979 | Riley et al. | 261/65 |
| 4,161,928 A | | 7/1979 | Teague et al. | 123/336 |
| 4,182,295 A | * | 1/1980 | Zeller et al. | 123/586 |
| 4,227,496 A | * | 10/1980 | Martel | 123/585 |
| 4,741,295 A | | 5/1988 | Hosoya et al. | 123/184.31 |
| 4,850,322 A | * | 7/1989 | Uthoff et al. | 123/399 |
| 4,860,709 A | | 8/1989 | Clarke et al. | 123/432 |
| 4,905,647 A | | 3/1990 | Kizer et al. | 123/337 |
| 4,945,865 A | * | 8/1990 | Lee | 123/184.43 |
| 5,417,193 A | * | 5/1995 | Fillman et al. | 123/352 |
| 5,492,093 A | | 2/1996 | Rygiel | 123/306 |
| 5,514,049 A | * | 5/1996 | Kamio et al. | 123/399 |
| 5,535,717 A | | 7/1996 | Rygiel | 123/306 |
| 5,769,045 A | | 6/1998 | Edwards et al. | 123/184.61 |

* cited by examiner

*Primary Examiner*—Andrew M. Dolinar
(74) *Attorney, Agent, or Firm*—Edwin W. Bacon, Jr.

(57) ABSTRACT

The secondary wide open throttle induction system according to the invention includes a throttle body for use in an engine intake manifold having a primary intake and at least one secondary intake. The throttle body device associated with the secondary intake. The throttle body includes a channel having an inlet and an outlet, a throttle plate disposed within the channel, and a throttle control coupled to the throttle plate. The outlet is adapted to connect to a secondary intake in the engine intake manifold. The throttle control regulates the throttle body.

1 Claim, 6 Drawing Sheets

SECONDARY WIDE OPEN THROTTLE INDUCTION SYSTEM

FIELD OF THE INVENTION

The present invention relates generally to an induction system. In particular, the present invention is directed to a secondary wide open throttle induction system for improved wide open throttle engine performance.

BACKGROUND

An internal combustion engine is traditionally designed with a "tuned" intake manifold or induction system manifold. The throttle body at the intake manifold permits control of air flow. Tuning the intake manifold via the throttle body prevents perceivable engine performance degradation. Additional flow of air at the intake manifold can increase the engine performance of torque and horsepower to a more desired level. Air flows into the intake manifold by first entering an initial duct and into an air cleaner box that houses an air filter. Air passes through the air filter into a plenum that routes the air to a primary intake manifold and throttle body. The throttle body is controlled and permits air to enter the intake manifold that routes the air to individual cylinders and out to the engine. The point from which the air enters the initial duct to pass to the throttle body has restrictions, such as bends and filters. Accordingly, there is a need to increase air flow into the intake manifold based on a desire to increase engine torque and horsepower performance.

SUMMARY OF THE INVENTION

The secondary wide open throttle induction system of the present invention provides an increase in air flow into the engine intake manifold. As a result, engine performance of torque and horsepower output is increased. The secondary wide open throttle induction system generally includes a secondary throttle body for use in an engine intake manifold having a primary intake and at least one secondary intake, the throttle body device being used with the secondary intake. The throttle body includes a channel having an inlet and an outlet, a throttle plate disposed within the channel, and a throttle control coupled to the throttle plate. The outlet is adapted to connect to a secondary intake in the engine intake manifold. The throttle control regulates the throttle body associated with the secondary intake(s) based on "wide-open" throttle body conditions.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
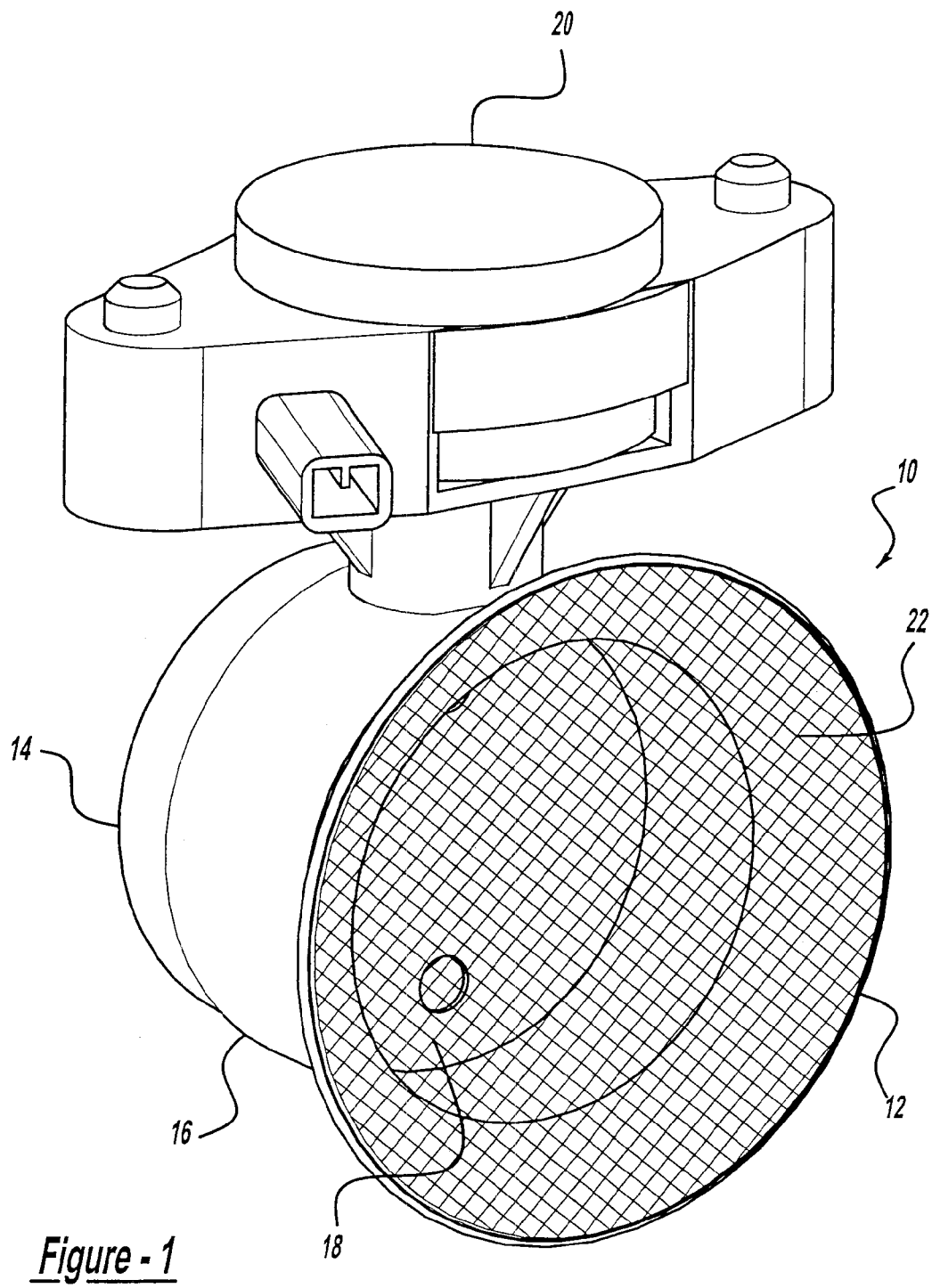
FIG. 1 is a perspective view of a throttle body device.
Figure 2:
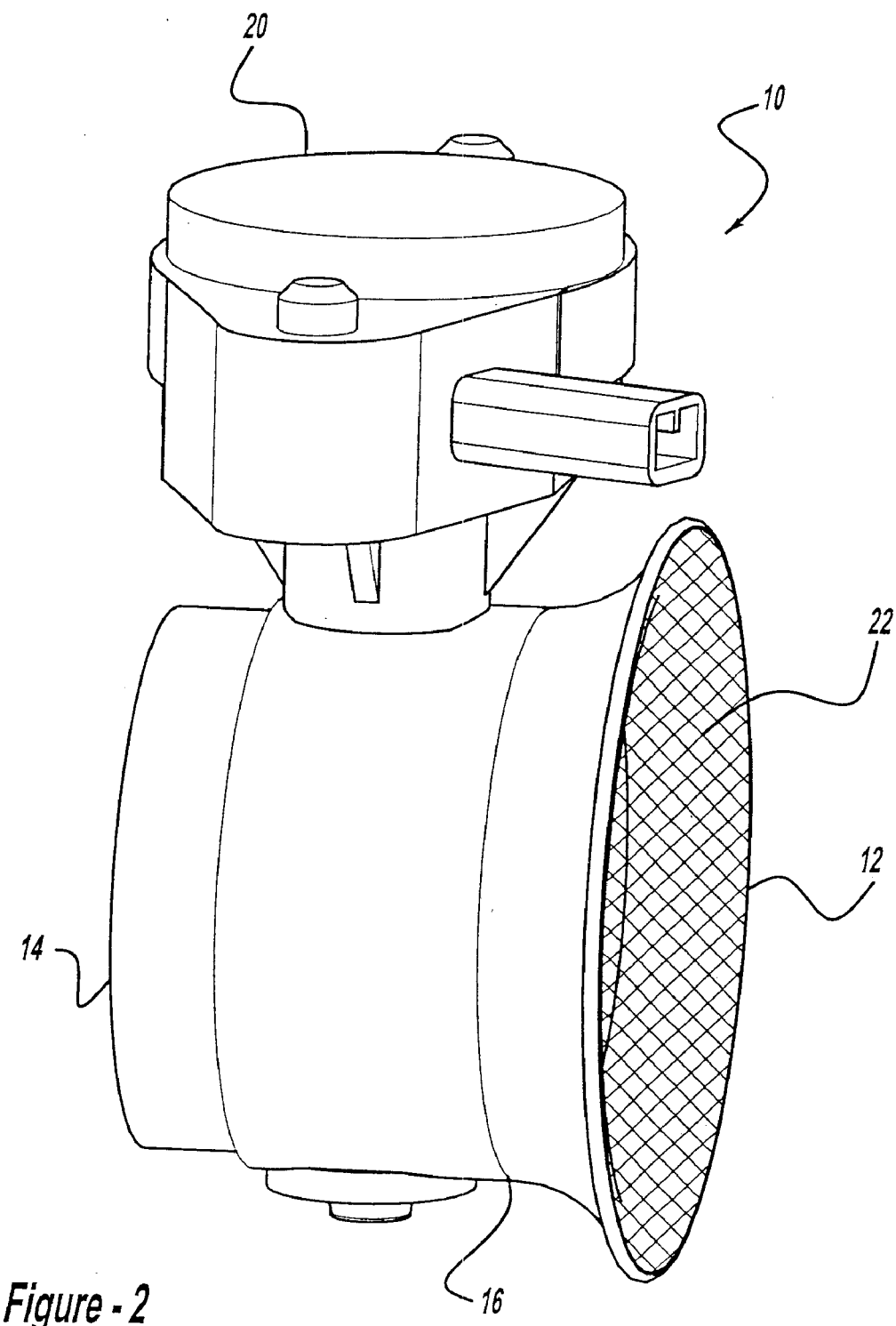
FIG. 2 is a side view of the throttle body device according to the present invention.

FIG. 1 and FIG. 2 illustrate a throttle body device 10 according to the present invention. The throttle body device includes an inlet 12, a channel 16, and an outlet 14. In the preferred embodiment, inlet 12 is outwardly curved. In the preferred embodiment, although air flows through the throttle body device 10 for a limited duration of time, a screen 22 preferably covers inlet 12 and is adequate to filter air flow. Otherwise, the air flow would be completely unfiltered. In the preferred embodiment, the outlet 14 is adaptably shaped to connect to an intake of an engine intake manifold. However, it should be appreciated that outlet 14 can be shaped to securely fit a variety of intake manifolds to which throttle body 10 would connect.

With a continued reference to FIG. 1, inlet 12 forms into channel 16 within which throttle plate 18 is disposed. The throttle plate 18 has a perimeter that is sized to fit channel 16. The throttle plate 18 is pivotly connected to the channel by well-known methods in the art. A throttle control 20, well-known in the art, is connected to the throttle plate 18. In the preferred embodiment, the throttle control 20 is a rotary solenoid. The throttle control 20 regulates the rotation of throttle plate 18 about a central axis to a position which permits air to enter and pass through channel 16, thus creating a controlled air flow through the secondary intake of the engine intake manifold.

Figure 3:
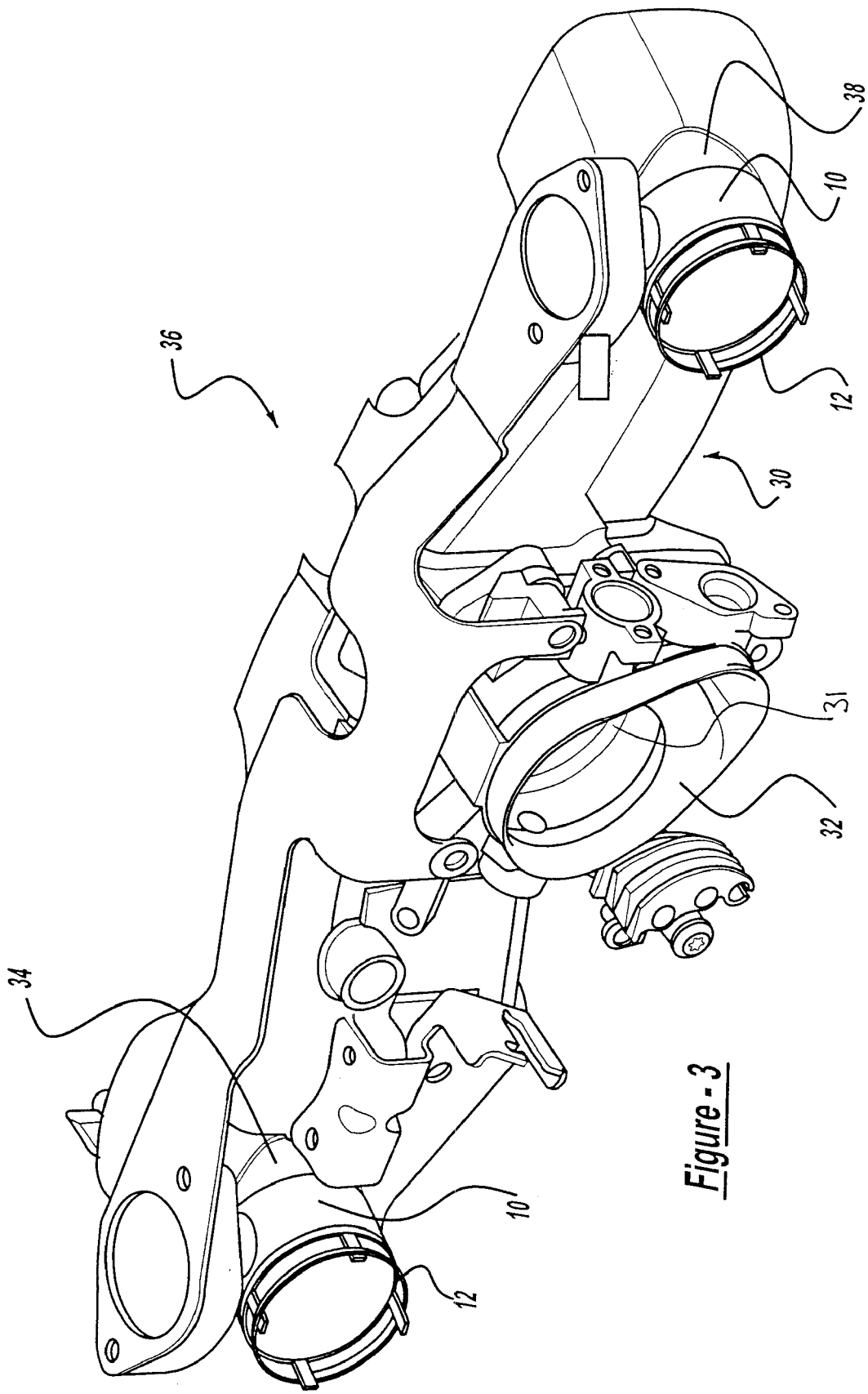
FIG. 3 is an elevational view of the throttle body device according to the present invention in an engine intake manifold.
Figure 4:
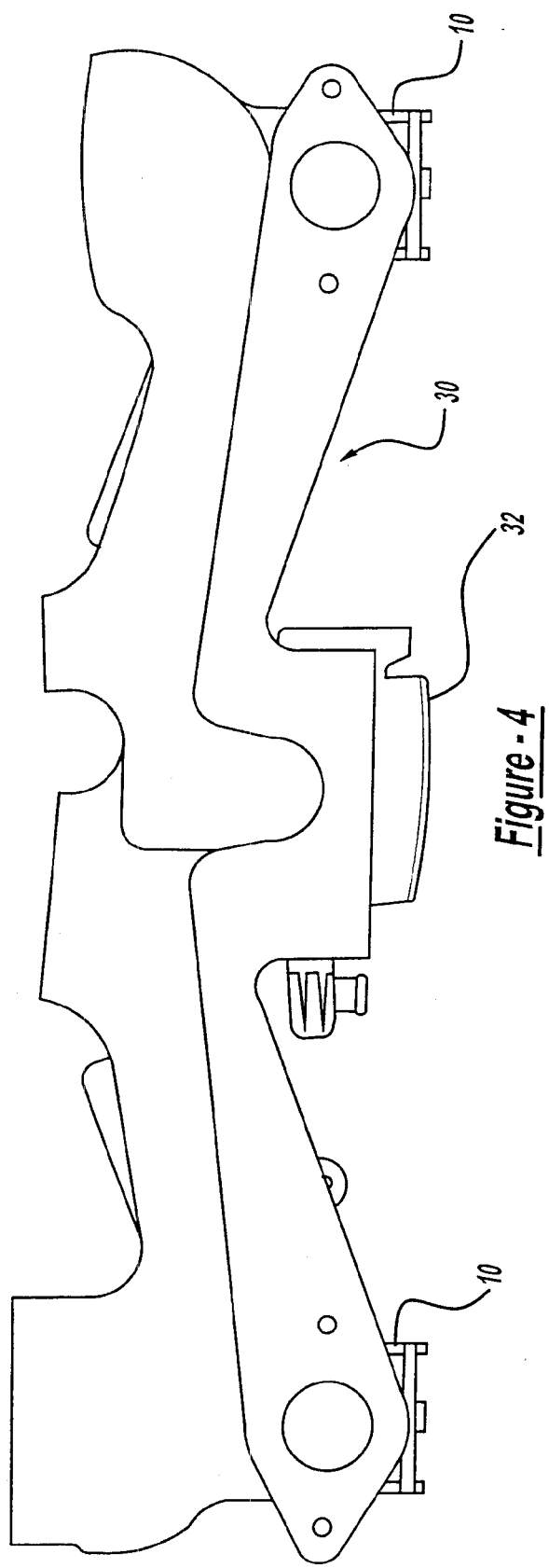
FIG. 4 is a top view of a throttle body device of the present invention in an engine intake manifold.

FIG. 3 and FIG. 4 show a secondary wide open throttle induction system 36. The secondary wide open throttle induction system 36 has an intake manifold 30. A primary intake 32 is disposed within intake manifold 30. A primary throttle body 31 is coupled to the primary intake 32. In the preferred embodiment, a pair of secondary intakes 34, 38 are disposed within the intake manifold 30. It should be appreciated that any number of secondary intakes can be disposed within the intake manifold 30. The secondary throttle body device 10 is preferably adapted to fit secondary intakes 34, 38 of intake manifold 30. It should be appreciated that the secondary throttle body device 10 can be unitarily formed with the engine intake manifold 30. The secondary intakes 34 and 38 provide openings in which more air directly enters into the intake manifold 30 as compared to an intake manifold having merely a primary intake. The secondary intakes 34, 38 permit air flow to bypass any restrictions such as filters and bends associated with duct work which are normally located in an air flow path directed to a primary intake of a conventional intake manifold. The air flow path into secondary intake 34, 38 preferably does not have filters or bypass restrictions. Rather, a screen is preferably placed over inlet 12 to provide limited filtering of air flow.

Air flows directly into the inlet 12, while the throttle plate 18 is open, and permits air to flow into the intake manifold 30, while the primary intake 32 also maintains a flow of air. That is, the primary intake maintains a primary air flow and the secondary intake independently provides a secondary air flow. However, the secondary throttle body device 10 located at the secondary intakes 34, 38 permit air flow for only a limited duration during a duty cycle of the throttle body associated with the primary intake 32. The secondary throttle body 10 is preferably electronically controlled.

Figure 5:
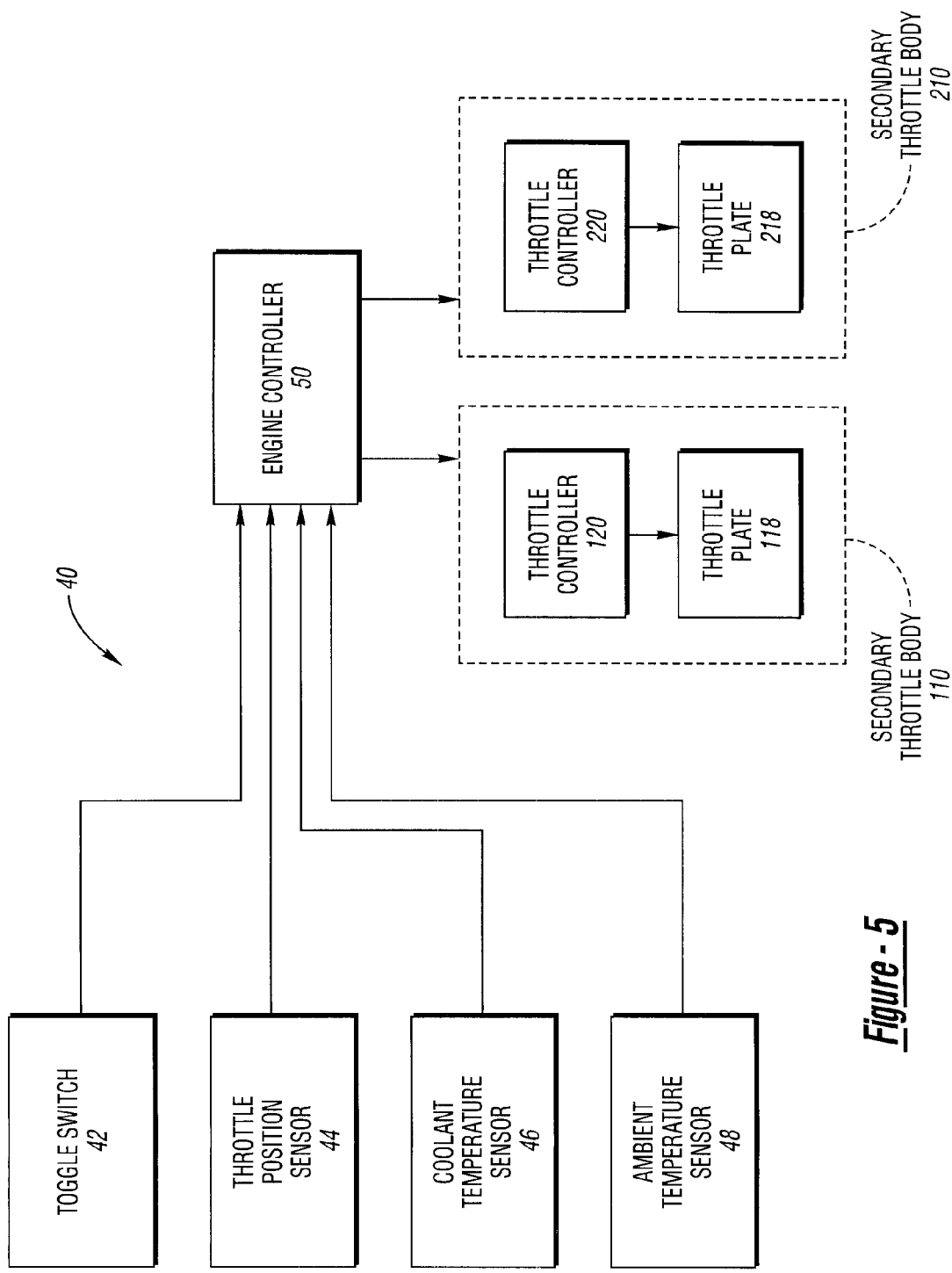
FIG. 5 is a flow diagram of the control system components of the present invention throttle body device.

FIG. 5 illustrates flow diagram of the control system components. A throttle control 20, connected to the throttle plate 18, is coupled to an engine controller 50. The control system is generally depicted at 40. The engine controller 50 is coupled between the throttle control 20 and activation input devices, including, but not limited to, a toggle switch 42, a throttle position sensor 44, a coolant temperature sensor 46 and an ambient temperature sensor 48, which provide input signals to the engine controller to identify activation conditions, associated with activation input devices, for which the secondary throttle body device 10 should be open. It should be appreciated, that the engine controller 50 can be connected to more than one throttle control 20. In the preferred embodiment, the throttle induction system has a pair of secondary throttle bodies 110, 210. A secondary throttle body device 10 is associated with each secondary intake 34 and 38.

The activation input devices, such as the toggle switch 42, throttle position sensor 44, coolant temperature sensor 46, and ambient temperature sensor 48, provide signals to the engine controller 50. The toggle switch 42 permits the driver of the automobile to enable the secondary wide open throttle body system. (The driver could also choose to turn the feature off.) The toggle switch 42 transmits a signal to the engine controller 50. The throttle position sensor 44 transmits a signal to the engine controller 50 if a pre-selected condition such as "wide-open" throttle is achieved. "Wide-open" throttle is selectively chosen when the throttle body associated with the primary intake achieves a certain position. For example, "wide-open" throttle occurs when the throttle creates a 98% opening of the channel in a throttle body associated with the primary intake. Consequently, when the primary throttle body associated with the primary intake is at "wide-open" throttle, then the secondary throttle body 10 associated with the secondary intakes 34 and 38 will be regulated to permit air to flow into the engine intake manifold 30. Of course, positions other than wide open throttle may also be used to trigger the secondary throttle body 10. The secondary throttle body 10 is preferably regulated to a substantially complete opening of its channel; however, it should be appreciated that the opening can be of any amount. When the primary throttle body associated with the primary intake falls below "wide-open" throttle, the secondary throttle body 10 will be regulated to prevent air from flowing into the engine intake manifold 30.

Additionally, other predetermined criteria can be evaluated. The coolant temperature sensor 46 indicates coolant temperature, and sends a signal to the engine controller 50. The ambient temperature sensor 48 indicates ambient temperature and sends a signal to the engine controller 50. The engine controller 50 evaluates all of the signals from the activation devices, sets the predetermined criteria signal, and transmits an appropriate signal to the throttle control 20.

Because "wide-open" throttle conditions do not exist for a long duration of time based on the duty cycle of the throttle associated with the primary intake, the secondary throttle body device 10 will open and permit a large amount of air into the manifold, based on "wide-open" throttle, for no more than a few seconds at a time. More air entering the engine intake manifold at "wide-open" throttle results in a performance change of higher engine horsepower and torque outputs.

Figure 6:
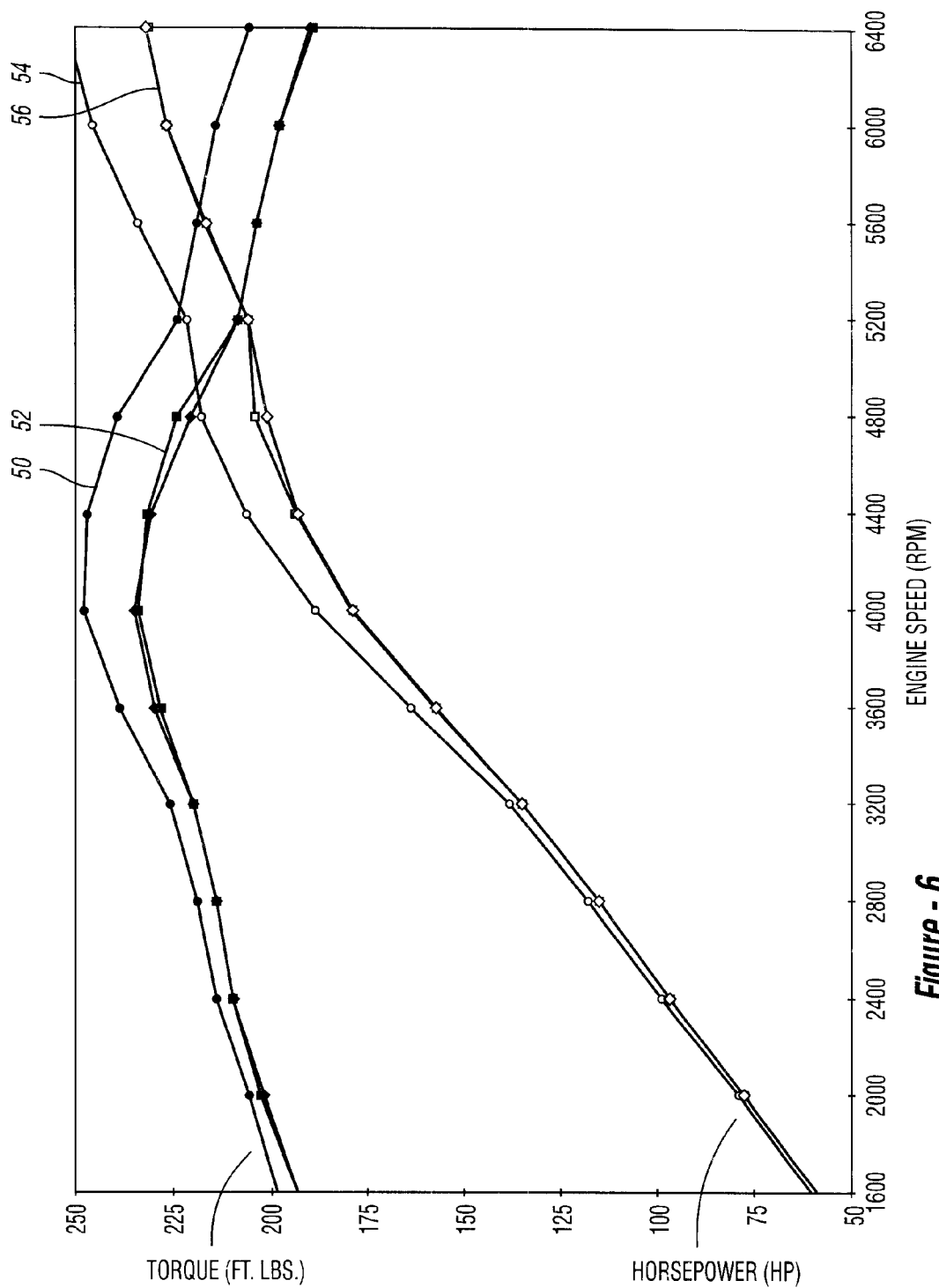
FIG. 6 is a graph of the performance characteristics of a secondary wide open throttle induction system.

FIG. 6 shows performance changes of engine horsepower (HP) and torque (ft lbs) outputs of an engine utilizing a secondary wide open throttle induction system utilizing two secondary throttle bodies. A higher horsepower based on RPM and torque based on RPM result. Torque curve 50 of an engine utilizing a secondary wide open throttle induction system having two secondary throttle bodies shows an increase in torque relative to a torque curve 52 which shows the torque of a conventional engine limited to having a primary intake. Horsepower curve 54 of an engine utilizing a secondary wide open throttle inducting system having two secondary throttle bodies shows an increased horsepower based on RPM relative to a horsepower curve 56 of a conventional engine limited to having a primary intake.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A secondary wide open induction apparatus comprising:

an engine intake manifold having a primary intake and at least one secondary intake located downstream of the primary intake;

a primary throttle body connected to the primary intake;

a secondary throttle body connected to each secondary intake, each secondary throttle body having an inlet, a channel, an outlet, and a normally-closed throttle plate disposed within the channel;

a throttle control for controlling the secondary throttle body, the throttle control being connected to the secondary throttle body;

a throttle position sensor for detecting the throttle position of the primary throttle body;

an engine controller receiving a throttle position signal from the throttle position sensor and transmitting a control signal to the throttle control to effect opening of the normally-close throttle plate in response to the magnitude of the throttle position signal exceeding a predetermined value; and a switch in electrical communication with the engine controller, with the engine controller interrupting the transmission of the control signal in response to the switch being in an off position.

* * * * *